US006405314B1

(12) United States Patent
Bailey

(10) Patent No.: US 6,405,314 B1
(45) Date of Patent: Jun. 11, 2002

(54) SECURE SYSTEM USING IMAGES OF ONLY PART OF A BODY AS THE KEY WHERE THE PART HAS CONTINUOUSLY-CHANGING FEATURES

(75) Inventor: Kenneth S. Bailey, Huntington Beach, CA (US)

(73) Assignee: Ecryp, Inc., Los Angeles, CA (US)

( * ) Notice: Subject to any disclaimer, the term of this patent is extended or adjusted under 35 U.S.C. 154(b) by 0 days.

(21) Appl. No.: 09/676,174

(22) Filed: Sep. 29, 2000

Related U.S. Application Data

(63) Continuation of application No. 09/208,283, filed on Dec. 8, 1998, now Pat. No. 6,175,923.

(51) Int. Cl.[7] ................................................. G06F 9/24
(52) U.S. Cl. ...................................... 713/186; 713/170
(58) Field of Search ................................. 713/186, 170; 382/115, 124, 125, 126, 127; 902/3; 356/71; 340/825.34; 705/76

(56) References Cited

U.S. PATENT DOCUMENTS

| | | | |
|---|---|---|---|
| 4,123,747 A | 10/1978 | Lancto et al. ............... 713/185 |
| 4,621,334 A | 11/1986 | Garcia .......................... 382/115 |
| 5,067,162 A * | 11/1991 | Driscoll, Jr. et al. ........ 382/126 |
| 5,280,527 A * | 1/1994 | Gullman et al. ............ 713/184 |
| 5,420,924 A * | 5/1995 | Berson et al. .............. 713/186 |
| 5,557,665 A | 9/1996 | Yamamoto .................. 379/198 |
| 5,572,597 A * | 11/1996 | Chang et al. ................ 382/125 |
| 5,613,012 A | 3/1997 | Hoffman et al. ............ 382/115 |
| 5,745,555 A | 4/1998 | Mark ....................... 379/93.03 |
| 5,787,154 A | 7/1998 | Hazra et al. ................ 379/9.03 |
| 5,805,686 A | 9/1998 | Moller et al. ................ 379/198 |
| 5,815,252 A * | 9/1998 | Price-Francis ............... 356/71 |
| 5,825,871 A | 10/1998 | Mark .......................... 379/355 |
| 5,838,812 A | 11/1998 | Pare, Jr. et al. ............. 382/115 |
| 5,864,613 A | 1/1999 | Flood .......................... 379/188 |
| 5,872,834 A | 2/1999 | Teitelbaum ............... 379/93.03 |
| 5,887,140 A * | 3/1999 | Itsumi et al. ................ 709/225 |
| 5,907,597 A | 5/1999 | Mark ....................... 379/93.03 |
| 5,982,913 A * | 11/1999 | Brumbley et al. ........... 382/124 |
| 6,002,784 A * | 12/1999 | Sato ............................ 382/124 |
| 6,005,963 A * | 12/1999 | Bolle et al. .................. 382/124 |
| 6,031,942 A * | 2/2000 | Nikayama .................... 382/284 |
| 6,075,876 A * | 6/2000 | Draganoff .................... 382/124 |

* cited by examiner

Primary Examiner—Thomas R. Peeso
(74) Attorney, Agent, or Firm—Fish & Richardson P.C.

(57) ABSTRACT

A secure system using a continuously-changing key that depends on the user's body part. A preferred embodiment obtains an image of the user's fingerprint and cements it according to a random generator. Only part of the image and not all of the image is sent at one time. The random segmentation insures that part of the image that is sent continuously varies from time to time. Therefore, an unauthorized receiver can receive only part but not all of the image. That only part of the image which is received will usually not be the same at the second as it is at the first time. Therefore, a received code cannot later be used to fool the system with the same credit card.

7 Claims, 5 Drawing Sheets

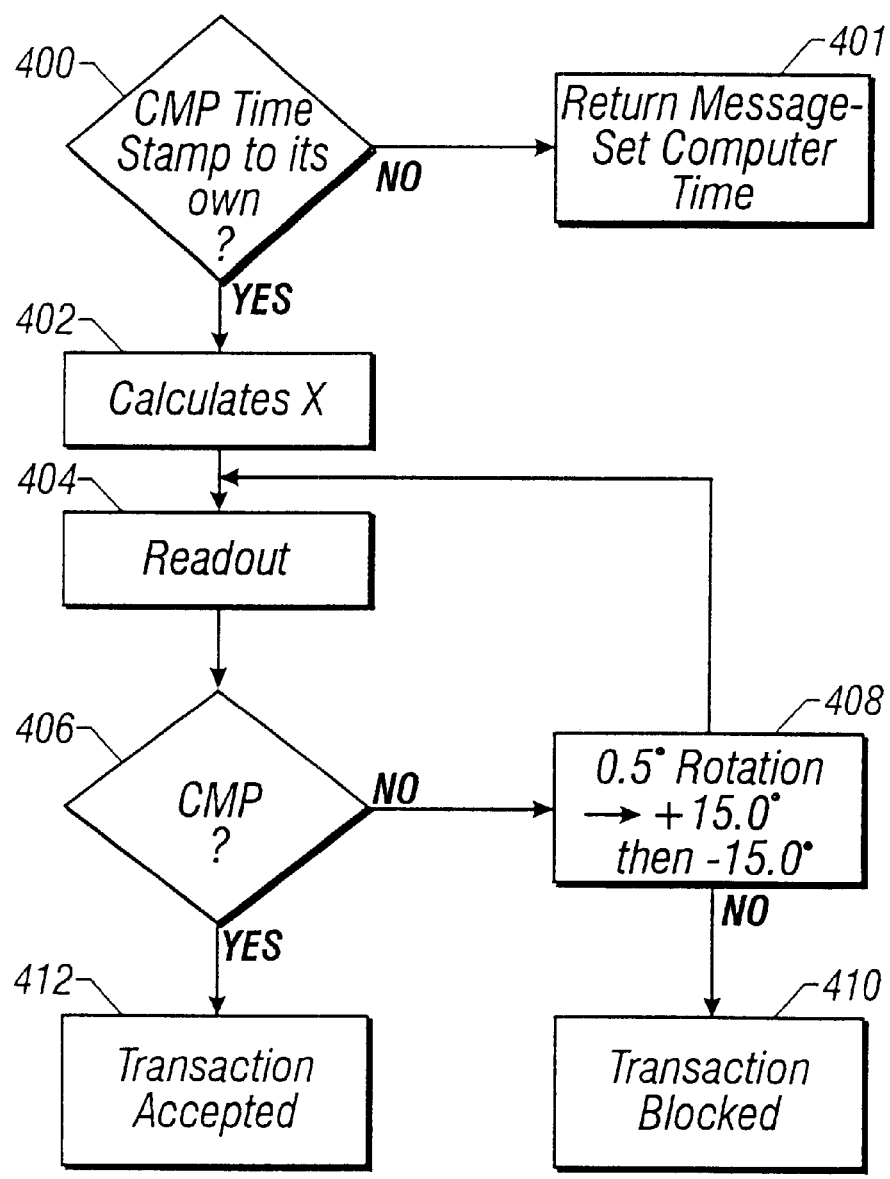

SECURE SYSTEM USING IMAGES OF ONLY PART OF A BODY AS THE KEY WHERE THE PART HAS CONTINUOUSLY-CHANGING FEATURES

This application is a continuation of Ser. No. 09/208,283 filed on Dec. 8, 1998, now U.S. Pat. No. 6,175,923.

FIELD OF THE INVENTION

The present system relates to a secured transaction key that is secured by reference to part, but not all of, a user's body part.

BACKGROUND OF THE INVENTION

Credit card transaction fraud is an expensive problem. Prevention of such fraud requires making sure that the credit card is not stolen or used in an authorized way. Some credit cards, for example, put the user's photograph on the credit card. It has also been suggested to use a fingerprint or a retinal scan for identification.

This problem becomes more difficult when carried out over the Internet. A stolen credit card can easily be used over the Internet since the person does not need to appear in person. There is no clerk to compare the person using the card to the photograph on the card.

Fingerprints have been suggested as an effective way of verifying a user's identity. The central credit card validating company could include an image of the user's fingerprint. Relatively inexpensive fingerprints scanners are available. The user inserts a specified finger into the fingerprint scanner, and the scan from the user's finger would be sent along with the credit card information. This received fingerprint information would then be compared with fingerprint information within the database, prior to accepting the transaction.

Problems with fingerprint comparisons of this type include the difficulty of comparing an incoming fingerprint with a huge number of possibilities from which it could be compared and the bandwidth.

The science of fingerprints hence defines the fingerprints, nd segregate the fingerprints into distinct classes. The classes of patterns currently used includes loops, whorls, and arches. Approximately sixty-five percent of the patterns are loops, thirty percent are whorls and approximately five percent are arches. Fingerprints are typically described in symbolic representation of alphanumeric clusters that define what is observed in the print itself in the terms of the loops, whorls, and clusters. Positive and absolute identification on the Internet or in any remote location becomes a difficult problem. A perpetrator of Internet access fraud often is very clever about the way that they carry out the fraud. For example, these people often use sophisticated systems to intercept information, including persons passwords and personal access numbers. Therefore, if a user sends an image of his fingerprint, the hacker could intercept that image and later use the intercepted image to perpetrate a fraud.

In addition, sending an entire image is a bandwidth-intensive operation. This operation could take many minutes, which could cause unacceptable delays.

It is possible, of course, to encrypt the entire image. However, this would require even more mathematical sophistication to the system.

SUMMARY

The present inventor recognized the desirability of using a constantly-changing personal access code on the Internet. Use of such a constantly-changing access code, of a type which is not able to be stored by a computer or calculated in any conventional manner, would be highly advantageous. In addition, the system should not be one which requires the user to memorize complicated information.

According to this system, a part of the user's body is used as the constantly-changing personal access code. However, rather than using the entirety of the image of the part of the user's body, this system selects only different portions of the image to send. The different portions of the image are calculated based on time and date stamps indicating when they are sent. Therefore, a hacker or unauthorized user who receives the information receives only a part of the information indicating the body part. No receiver gets enough information to reconstruct the entirety of the image. The unauthorized receiver therefore could not reuse the information at some later time, because that later time would have a different time stamp and would hence require different information.

Therefore, the unauthorized reception does the receiver virtually no good, since the unauthorized reception does not provide enough information to allow the receiver to reconstruct the information at some later time. It also does not give the receiver all the information about the fingerprint.

This system has another added advantage of allowing a reduction in the amount of information which is sent. This hence reduces the total needed bandwidth of the system, and reduces the amount of time that will be necessary for the operation.

In addition, the present system includes additional aspects, including an encryption key which adds further security to the system, and an additional aspect compensates for orientation of the fingerprint.

These and other aspects will now be described in detail with reference to the accompanying drawings, wherein:

BRIEF DESCRIPTION OF THE DRAWING

FIG. 3 shows a time and day stamp format;

FIG. 4 shows a flowchart of operation of a first embodiment;

DESCRIPTION OF THE PREFERRED EMBODIMENTS

Figure 1:
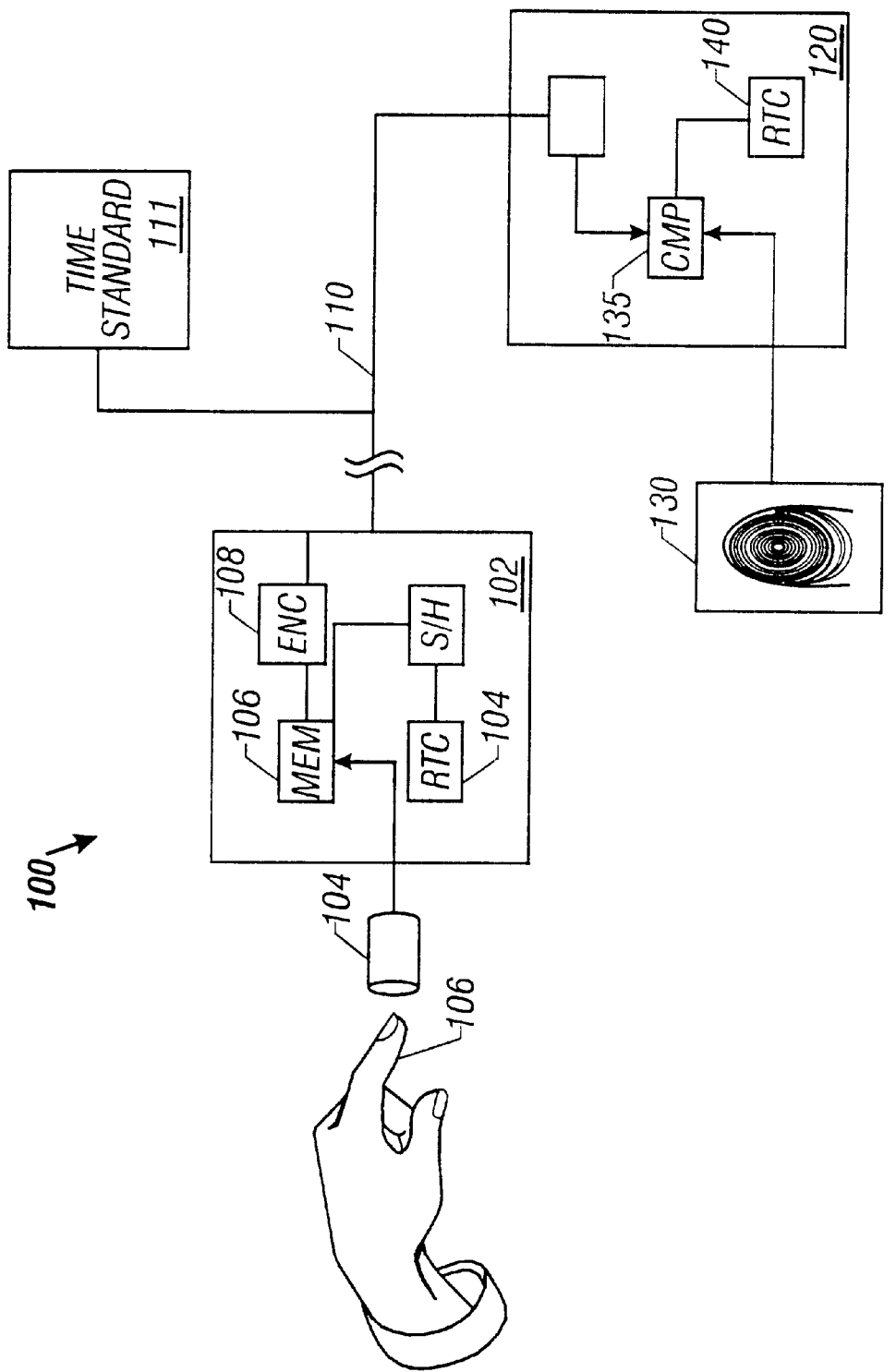
FIG. 1 shows a segmented fingerprint of the type preferably used according to the present system.

FIG. 1 shows a basic block diagram of the system. The remote premises 100 is typically the user's home or place of business. The remote premises includes a personal computer 102 and a fingerprint scanner 104. The user places their finger 106 into the fingerprint scanner, and the PC 102 controls the fingerprint scanner according to a prestored program in its memory. The fingerprint information is then sent over the telephone line 110 to the central computer 120. The central computer 120 includes a database memory 130 which includes a plurality of fingerprints stored therein. Each stored fingerprint preferably includes a digitized version of the entire fingerprint of any user who is authorized.

Figure 2:
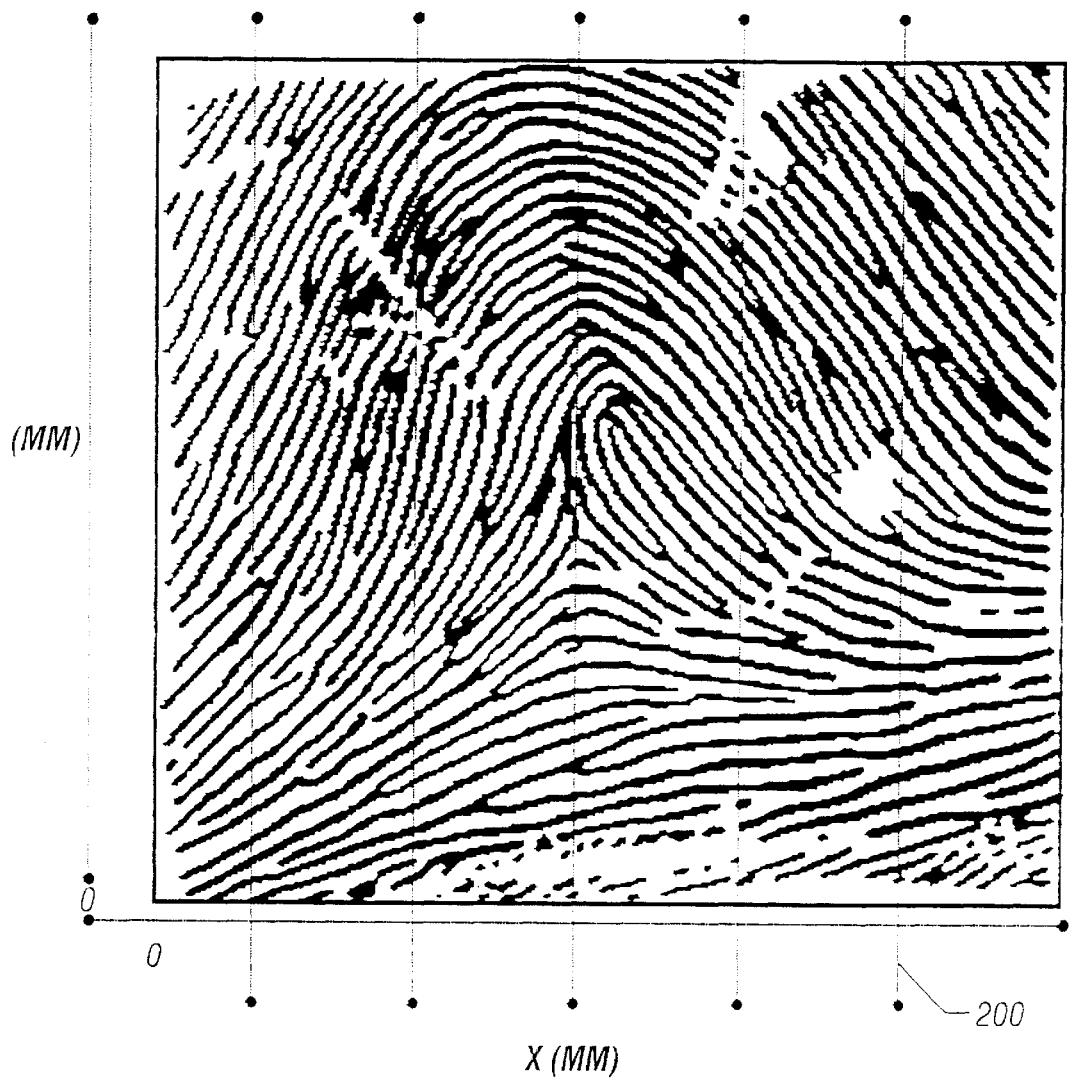
FIG. 2 shows a diagram of a fingerprint that is segmented in the way done according to the preferred mode of the present specification.

FIG. 2 shows a sample fingerprint in its entirety set forth in a grid pattern. The segmentation processing as done according to the present invention is carried out according to the x,y grid also shown in FIG. 2. The x coordinate of the fingerprint is segmented to form lines such as 200. In this embodiment, the lines are formed at a constant pitches, but in other embodiments the lines could be formed at any random pitch. The pitch of the lines are selected according to the time and day stamp, which is effectively random. The local computer 102 includes a real-time clock 104, which produces a time and day stamp of the shown in FIG. 3. According to one embodiment, the day of the month is added to the hour of the day and the minutes, and the least two significant bits form the number of millimeters of pitch. Different techniques for selectingthe distance between lines are also described herein.

The fingerprint scanner 104 obtains the entire image of the fingerprint and places it into working memory 106. The output from real-time clock 104 controls a sample-and-hold circuit which selectively reads columns of information out of the working memory 106. Each column corresponds to an n-pixel-wide sample along each of the x values shown in FIG. 2 where n is between 1 and 20. In the FIG. 2 embodiment, therefore, there are preferably five, 5-pixel-wide columns that are read out from the memory 106. These five columns are assembled into a message, and sent over the telephone line. The encryption block, shown as 108, provides further optional protection of the information prior to sending.

At the other end, the information 110 is received in the computer 120. The information received includes the packet sent by computer 102 which is of the form shown in FIG. 3. The portion 300 is the real-time clock information. In this embodiment, the clock information is shown showing Jun. 24, 1998, 6:04 p.m. (1804 in 24-hour time). As explained above, the simplistic algorithm given herein adds 24+18+4 to form 46 mm between the samples 200.

The compare process 135 carries out the flowchart shown in FIG. 4 to determine accurately whether it should accept the information as being authorized.

First, at step 400, the compare process compares the time stamp to its own time stamp as stored in the real-time clock 140. The incoming time stamp is taken as being correct so long as it is within a predetermined threshold, e.g., 10 minutes of its own time stamp. If it is not, the system returns a message at 401 indicating to the PC 102 that it should set its time.

An alternative embodiment executes a routine in the PC to set the PC real time clock 104 using an internet-based time standard 111, prior to sending the fingerprint information. If this is done, the threshold at step 400 can be shortened, e.g. to one minute.

If the time stamp compare at step: 400 is ok, flow passes to step 402 where the system calculates the x values. At step 404, the system reads out its own values from the database memory 130 storing the entirety of the user's fingerprint information. The two are compared at step 406. If the comparison indicates that the two are not the same, then a 0.5° rotation is carried out at step 408, followed by flow passing to step 404 for the information to be re-read with a rotation. This is done up to +15° and then to −15°. If none of these comparisons agree, the transaction is blocked at step 410. If the comparison is determined as agreeing at step 406, then the transaction is accepted at step 412.

The above has described one way of segmenting the date and time stamp. Another way, of course, is to simply segment the real-time clock into two-digit numbers. Any way of taking the date and time stamp and segmenting it such that it effectively forms random information could be used according to this embodiment.

Another way is to use the lowest-resolution two digits, unless they have been used within the past thirty days. This system would prevent re-use of the numbers, to ensure that the value is constantly changing, and that any attempt to re-use the same information would be blocked.

Figure 5:
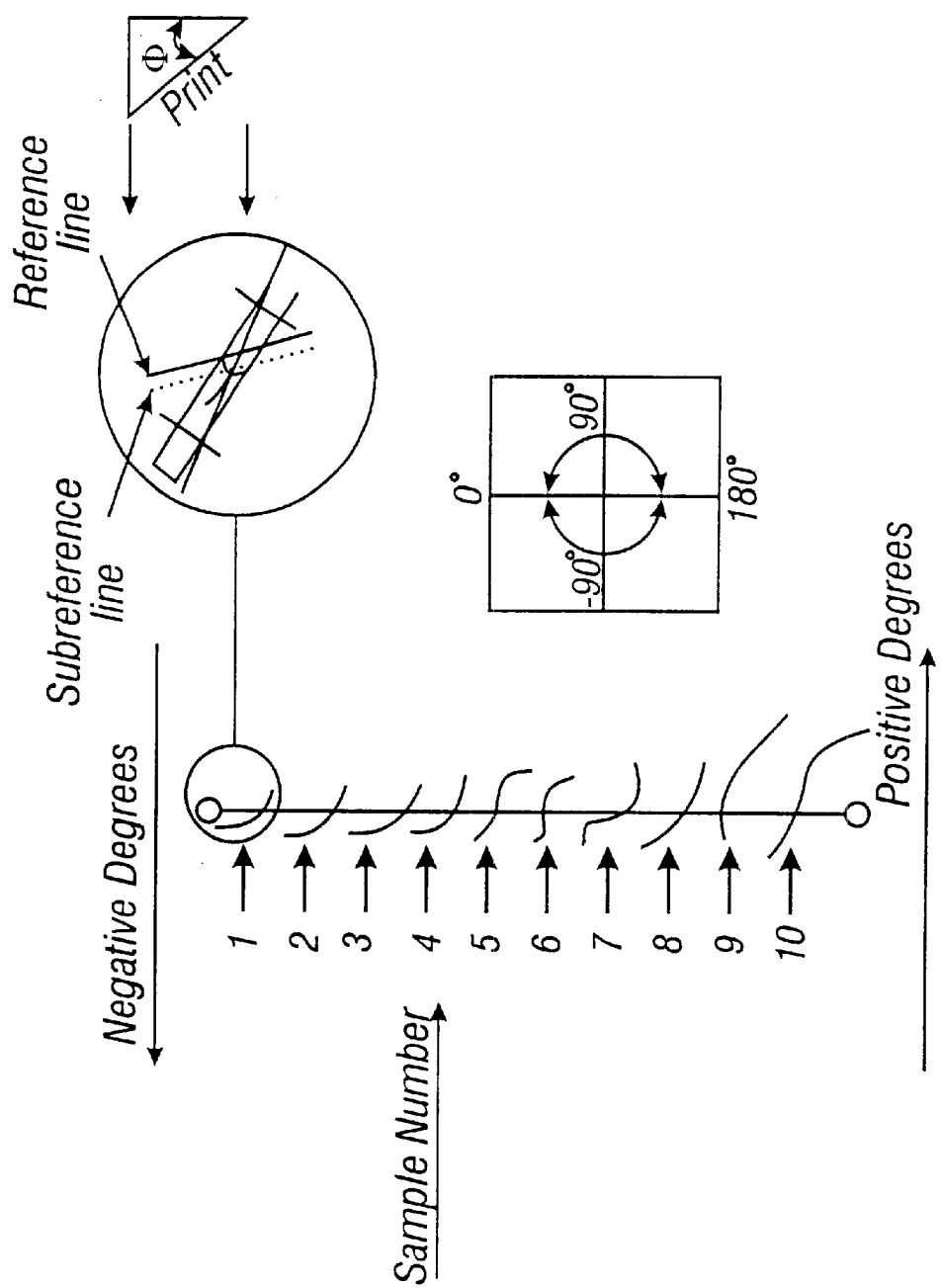
FIG. 5 shows a way in which a second embodiment obtains angle information.

FIG. 5 shows a preferred way of detecting the information and sending it. Each curve, line, and sworl can be reduced to its mathematical exponential equivalent using logarithmic functions. A reference line is chosen as described above. At the intersection of the reference line and the fingerprint subject line, the direction of the line is determined in degrees. The degrees are either positive (less than 180) or negative (greater than 180) from the point of reference.

FIG. 5 for example, shows an intersection of the line 0—0 with fingerprint. The point 1 corresponds to the sample 1. There is a sub-reference line and a reference line, at which the angle of the line is determined. FIG. 5 shows that angle at point 1 is −22.16°.

The number of samples taken is dependent on the number of fingerprint information that crosses the reference line. These samples could be obtained using a logarithmic encryption scheme.

Figure 6:
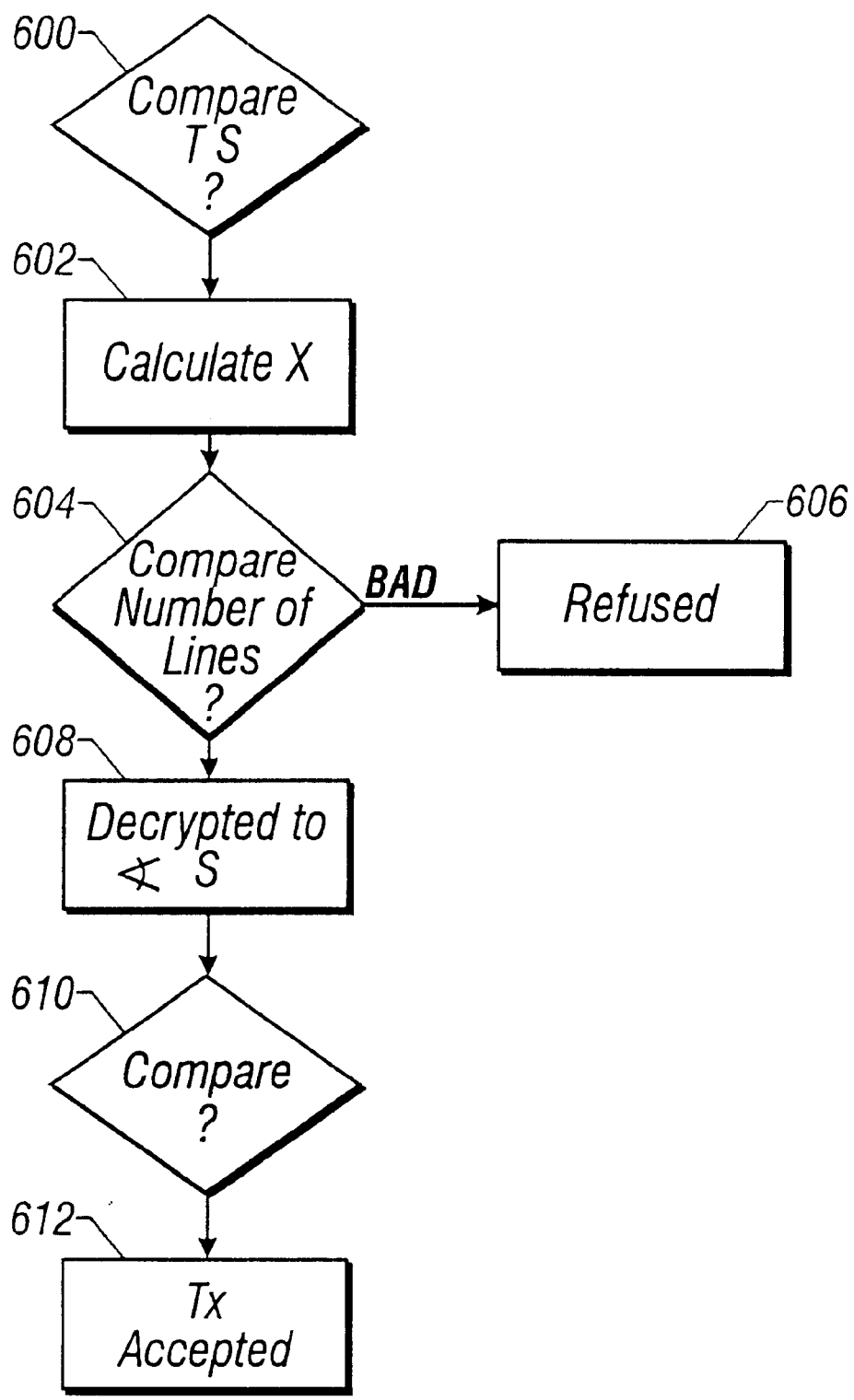
FIG. 6 shows a flowchart of operation of the second embodiment.

This second embodiment, therefore, uses a process in the computer 120 which operates according to the flow chart of FIG. 6. As in FIG. 4, step 600 compares the time stamp with its own to make sure that a bogus time stamp is not being sent. Again, x is calculated at step 602. At step 604, the system detects the number of lines which are received with the number of fingerprint data that cross the reference line in its own database. This information is an initial comparison, and importantly this information will not change based on tilt of the fingerprint. If this is bad at step 604, the operation is refused at step 606. At step 608, the incoming encrypted information is decrypted back to angles. This decrypted information then represents the various angles of the various lines. The comparison done at step 610 then compares the angle of each line with the angle of each line in its database. If correct, or if all angles differ by the same amount, the transaction is accepted at step 612. This system does not require rotation compensation, since the compare step 612 accepts the comparison even if all angles are wrong by the same amount. Hence, this system effectively built-in finger tilt compensation.

Although only a few embodiments have been disclosed in detail above, modifications are possible while staying within the subject matter of the present claims. For example, while this embodiment describes specific ways of using the time and day stamp to form a constantly-changing indicia, other random ways of forming the indicia are also possible. An important feature is that the operation is constantly changing, and that a user's body part is used. In addition, similar operations could be carried out using retinal scans, or other print information so long as that print information is unique. All such modifications are intended to be encompassed within the following claims.

What is claimed is:

1. A method of verifying a remote transaction, comprising:

receiving information indicative of an image of a user's unique body part, said information including only some, but not all, of the image of the user's body part, said information including only samples of said body part along plural separated portions, and the information which is received changing with substantially each use;

comparing said information with information in a remote database; and accepting a transaction only if the received information corresponds to the information in said remote database.

2. A method as in claim 1 wherein said user's body part is a fingerprint.

3. A method as in claim 2 wherein said information indicates samples of said fingerprints only along certain separated lines.

4. A method as in claim 1 wherein said information includes samples of a user's fingerprint, each said sample indicating an angle between a feature of the fingerprint at the separated portions and a specified line, location of the specified line being variable.

5. A method as in claim 2 further comprising compensating said fingerprint for an amount of tilt between a first time and a second time.

6. A method as in claim 1 wherein said accepting comprises determining angles of parts along said line, and determining if the angles have a relationship to one another which is the same as a relationship in said data base to inherently carry out tilt compensation.

7. A system, comprising:

a scanner which takes an image of a user's body part; and a processor, receiving said image, and transmitting only a plurality of separated parts, but not all of said image, said plurality of separated parts being a plurality of sample which are newly selected with each use, and hence change with substantially each use at a second time, said processor converting said information into numbers indicative of the information, and transmitting said information.

* * * * *